United States Patent [19]

Kasai et al.

[11] Patent Number: 4,694,035
[45] Date of Patent: Sep. 15, 1987

[54] PROCESS FOR PREPARING LARGE-SIZED POLYMER PARTICLES

[75] Inventors: Kiyoshi Kasai, Yokkaichi; Masayuki Hattori, Aichi; Osamu Kikuchi, Yokkaichi; Hiromi Takeuchi, Yokohama; Haruhiro Hirai, Mie; Nobuo Sakurai, Yokohama, all of Japan

[73] Assignee: Japan Synthetic Rubber Co., Ltd., Tokyo, Japan

[21] Appl. No.: 823,013

[22] Filed: Jan. 27, 1986

[30] Foreign Application Priority Data

Jan. 30, 1985 [JP] Japan ................................. 60-14460
Jun. 10, 1985 [JP] Japan ................................ 60-124266
Aug. 22, 1985 [JP] Japan ................................ 60-183084

[51] Int. Cl.$^4$ .............................................. C08F 2/18
[52] U.S. Cl. .................................. 524/458; 526/201; 526/203
[58] Field of Search ............... 524/458, 460; 526/201, 526/203

[56] References Cited

U.S. PATENT DOCUMENTS

| | | | |
|---|---|---|---|
| 3,424,706 | 1/1969 | Smith | 524/458 |
| 3,642,680 | 2/1972 | Jennings | 524/460 |
| 4,186,120 | 1/1980 | Ugelstad | 524/458 |
| 4,247,434 | 1/1981 | Lovelace | 524/458 |
| 4,254,004 | 3/1981 | Abbey | 524/458 |
| 4,331,788 | 5/1982 | Arnal | 526/201 |
| 4,419,245 | 12/1983 | Barnett | 526/201 |
| 4,459,378 | 7/1984 | Ugelstad | 524/458 |
| 4,530,956 | 7/1985 | Ugelstad | 524/458 |

*Primary Examiner*—Paul R. Michl
*Attorney, Agent, or Firm*—Oblon, Fisher, Spivak, McClelland & Maier

[57] ABSTRACT

A process for preparing large-sized polymer particles having a particle diameter in a range of 0.1 to 500 μm by seeded polymerization is described, comprising:

finely dispersing a polymerizable monomer in an aqueous medium to prepare a monomer dispersion in which a number average particle diameter of the resulting monomer droplets is not larger than that of seed particles, and a number average particle diameter in a semi-stable condition (Dm) of the monomer droplets satisfies, with a desired number average particle diameter of the final polymer particle as D, the following relation:

$$0.5 \times D < Dm < 3.5 \times D$$

combining said monomer dispersion with a dispersion of seed particles to make the polymerizable monomer absorbed or adsorbed on the seed particles; and polymerizing the polymerizable monomer in the presence of a polymerization initiator.

12 Claims, 5 Drawing Figures

(x 1200)

(x 1200)

(x 2000)

PROCESS FOR PREPARING LARGE-SIZED POLYMER PARTICLES

BACKGROUND OF THE INVENTION

The present invention relates to a process for preparing large-sized polymer particles and more particularly to a process for preparing large-sized polymer particles having a particle diameter falling within a range of about 0.1 to 500 μm by seeded polymerization.

Polymer particles, particularly monodisperse polymer particles having a particle diameter range of about 0.1 to 500 μm are demanded in many fields, but are generally quite difficult to prepare. Emulsion polymerization can produce monodisperse polymer particles relatively easily, but only small-sized particles having a diameter of less than 1 μm. It is said that even under specific conditions only polymer particles having a diameter of 3 μm at most can be prepared by emulsion polymerization. On the other hand, suspension polymerization can produce relatively large polymer particles having a diameter of 1 to 200 μm. The particle diameter distribution of these polymer particles, however, is broad; monodisperse polymer particles are difficult to prepare by suspension polymerization. Therefore, in preparing monodisperse, large-sized polymer particles, it is necessary to classify polymer particles obtained by suspension polymerization. This method, however, has disadvantages in that the number of steps is increased, making the process complicated, and the yield is low.

A method of preparing relatively large-sized, monodisperse polymer particles is disclosed in Japanese Patent Application Laid-Open Nos. 97582/1979 and 126288/1979.

The method of Japanese Patent Application Laid-Open No. 97582/1979 is such that a chain transfer agent is added during emulsion polymerization to thereby prepare polymers having a much lower molecular weight than the usual polymer latex, and with these polymers as seed particles, a slightly water-soluble unsaturated monomer is made absorbed on the seed particles and then polymerized. In this method, however, when commonly used oil-soluble or water-soluble polymerization initiators are used, problems such as aggregation and formation of new particles arise. Thus large-sized, monodisperse polymer particles are difficult to prepare with high reliability and in high yield by the above method.

In the method disclosed in Japanese Patent Application Laid-Open No. 126288/1979, at the first stage, an organic compound having a solubility in water of less than $10^{-2}$ g/l $H_2O$, which functions as a swelling aid, is made absorbed on seed particles, and at the second stage, a slightly water-soluble monomer, the volume of said monomer being about 100 times that of the seed particles, is made absorbed on the seed particles to thereby prepare swollen particles and then the monomer is polymerized by the use of a water-soluble polymerization initiator (e.g., potassium persulfate) or oil-soluble polymerization initiator (e.g., azobisisobutyronitrile) while maintaining the swollen particle form. This method, however, has several disadvantages. For example, when an oil-soluble polymerization initiator is used, monomer droplets remaining unabsorbed on the seed particles are polymerized as such. As a result, a large amount of coagulate is formed and the yield is decreased. When a water-soluble polymerization initiator is used, even if the concentration of the emulsifier is below the critical micell concentration, low molecular weight polymers formed by polymerization in an aqueous phase act as the emulsifiers, thereby allowing so-called soap-free emulsion polymerization to partially or wholly proceed, and thus the form of swollen particles cannot be maintained. Another problem of the above method is that polymer particles obtained are not in the spherical form but in the deformed form by the action of the organic compound of low water solubility as a swelling aid to be absorbed on the seed particles at the first stage.

In order to overcome the above problems, a method of swelling seed particles without the use of a swelling aid has been developed (see J. H. Jansson, M. C. Wellons & G. W. Poehlein, *J. Polym. Sci., Polym. Lett. Ed.*, 21, 937-943 (1983)). In accordance with this method, a monomer and an oil-soluble polymerization initiator are mixed finely dispersed in an aqueous medium to prepare an aqueous dispersion, and this aqueous dispersion is added to a seed particle dispersion (latex), whereby the seed particles are swollen in a high swelling ratio. This method, however, has several disadvantages and is not sufficiently satisfactory for practical use.

For example, when styrene is used as the monomer and added in such an amount that the weight ratio of monomer to seed particles is 100:1, even if seed particles having a uniform diameter are used, only swollen particles having a diameter of about 1 to 3 μm can be obtained while maintaining the uniform diameter. If swollen particles having a diameter exceeding the above range are intended to prepare, the particle diameter distribution is inevitably broadened; monodisperse, large-sized polymer particles having a diameter of more than 3 μm cannot be obtained. In the case of monomers having a high water solubility, such as methyl methacrylate (MMA), swollen particles having a diameter range of about 1 to 3 μm are difficult to prepare while maintaining the uniform particle diameter. Even if uniform particles are obtained, their stability is poor; the uniformity is quickly lost and the particles become uneven in diameter. Moreover, in the case of monomers having a low water solubility, such as 2-ethylhexyl acrylate, monomer droplets in the aqueous dispersion are stable and remain unabsorbed on the seed particles for a long period of time, thereby preventing the formation of swollen particles having a uniform particle diameter.

In summary, the method disclosed by J. H. Jansson et al. has disadvantages, for example, in that in preparation of large-sized, monodisperse polymer particles by seeded polymerization, only limited monomers such as styrene can be used, and even with such monomers, monodisperse polymer particles having a particle diameter as large as more than 3 μm cannot be obtained.

SUMMARY OF THE INVENTION

An object of the present invention is to provide a process for preparing large-sized polymer particles by seeded polymerization.

Another object of the present invention is to provide a process for preparing monodisperse polymer particles having a particle diameter as large as 0.1 to 500 μm, particularly 5 μm or more.

Still another object of the present invention is to provide a process whereby monodisperse, large-sized polymer particles can be prepared regardless of the type of a monomer to be polymerized.

It has been found that the objects can be attained by preparing a dispersion of a monomer to be polymerized in an aqueous dispersion, satisfying the requirements as described hereinafter, and adding the monomer dispersion to a dispersion of seed particles to thereby make the monomer absorbed or adsorbed on the seed particles.

The present invention relates to a process for preparing large-sized polymer particles having a particle diameter falling in a range of 0.1 to 500 μm by seeded polymerization, which process comprises;

finely dispersing a polymerizable monomer in an aqueous medium to prepare a monomer dispersion in which a number average particle diameter of monomer droplets in the dispersion is not larger than an average particle diameter of seed polymer particles and, moreover, a number average particle diameter in a semi-stable condition, Dm, of the monomer droplets satisfies, with a desired particle diameter of the final polymer particles as D, the following relation:

$$0.5 \times D < Dm < 3.5 \times D;$$

combining the above monomer dispersion with a dispersion of seed polymer particles to make the polymerizable monomer absorbed or adsorbed on the seed polymer particles;

and polymerizing the polymerizable monomer in the presence of a polymerization initiator.

DETAILED DESCRIPTION OF THE INVENTION

In accordance with the process of the present invention, firstly, a polymerizable monomer is finely dispersed in an aqueous medium to prepare a monomer dispersion or emulsion. This monomer dispersion should be prepared so as to meet the following requirements.

(1) A number average particle diameter of monomer droplets in the dispersion is not larger than a number average particle diameter of seed particles.

(2) A number average particle diameter in a semi-stable condition of monomer droplets satisfies, with a desired number average particle diameter of the final polymer particles, the following relation:

$$0.5 \times D < Dm < 3.5 \times D \quad (a)$$

The objects of the present invention are attained only when the above requirements are satisfied.

If the number average particle diameter of monomer droplets is larger than the number average particle diameter of seed particles, monomer droplets swell regardless of the seed particles, producing swollen particles having a broad particle diameter distribution, and thus the desired monodisperse polymer particles cannot be prepared.

Preferably the maximum particle diameter of monomer droplets is not larger than the number average particle diameter of seed particles. The term "maximum particle diameter" as used herein means a particle diameter of the largest of normal monomer droplets excluding exceptionally and abnormally large monomer drops as obtained by finely dispersing a polymerizable monomer in an aqueous medium. Thus the maximum particle diameter can be said to be a "substantially largest particle diameter".

The number average particle diameter and the maximum particle diameter of monomer droplets as used herein are values as determined just before combining the monomer dispersion with a seed particle dispersion.

The number average particle diameter and the maximum particle diameter can be determined based on results as obtained by measuring an optical micrograph when they are not less than 0.8 μm, and when they are less than 0.8 μm, based on results of measurement by, e.g., the dynamic light scattering method (see, for example, *J. Chem., Phys.*, 72 (11), page 6024 (1980)) or the centrifugal settling or floating analytical method.

Figure 1:
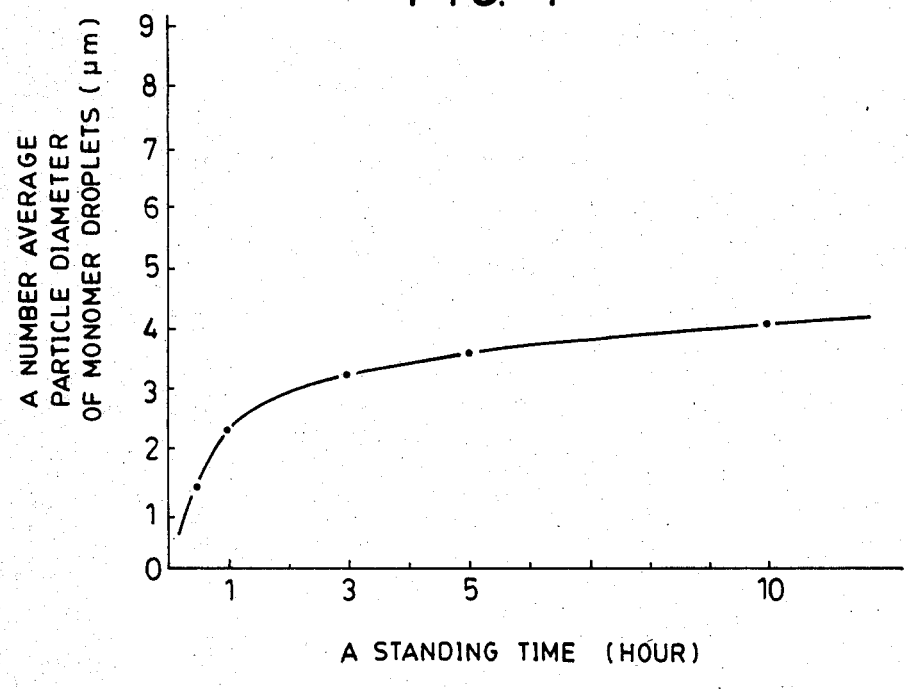
FIG. 1 is a graph showing a relation between a number average particle diameter of monomer droplets and a standing time.

The term "number average particle diameter in a semi-stable condition, Dm, of monomer droplets" as used herein means a number average particle diameter of monomer droplets in a semi-stable condition after preparation of the aqueous dispersion of the polymerizable monomer, i.e., in a condition that changes in particle diameter become moderate on standing the aqueous monomer dispersion. On standing the aqueous dispersion of the polymerizable monomer after preparation thereof, as shown in FIG. 1, the particle diameter of monomer droplets greatly changes at the initial stage but gradually reaches a constant value at which the monomer droplets are believed to be stabilized to a certain extent. In general, this stabilized condition is reached on allowing the aqueous monomer dispersion to stand or stirring it moderately for 3 hours after preparation of the aqueous monomer dispersion. Thus the term "number average particle diameter in a semi-stable condition, Dm, of monomer droplets" as used herein means a number average particle diameter of monomer droplets as determined after allowing the aqueous monomer dispersion to stand or stirring it moderately for 3 hours after the preparation thereof.

Measurement of a number average particle diameter in the determination of Dm of monomer droplets can be carried out in the same manner as described above.

One of the features of the present invention, therefore, resides in that colloidal stability of the aqueous monomer dispersion is controlled so as to satisfy the relation represented by the equation (a) as described above, more preferably the following relation:

$$0.6 \times D < Dm < 1.8 \times D$$

(wherein D is, as defined above, a desired number average particle diameter of the final polymer particles).

In accordance with the process of the present invention, secondly, the aqueous monomer dispersion as prepared above is combined with a dispersion of seed particles to make the polymerizable monomer absorbed or adsorbed on the seed particles, whereupon swollen particles are obtained.

Thus the process of the present invention permits to produce swollen particles having a uniform particle diameter, large or small, regardless of the type of the polymerizable monomer, which could not be obtained by conventional techniques. Moreover, by using monodisperse seed particles, swollen particles in a monodisperse form can be obtained.

In the present invention, as described above, it is required for Dm and D to satisfy the relation indicated by the equation (a). If Dm is not larger than $0.5 \times D$, some monomer droplets remain unabsorbed or unadsorbed on the seed particles and only swollen particles having a broad particle diameter distribution can be obtained. Upon polymerization of the polymerizable monomer in such a condition, not monodisperse polymer particles but undesirable polymer particles having a broad particle diameter distribution are formed. On the other hand, if Dm is not smaller than $3.5 \times D$, when an aqueous monomer disperstion and a seed particle dispersion are combined, swollen particles having a uniform particle diameter distribution are once formed in a short time, but its particle diameter distribution is immediately broadened because the particle diameter of the swollen particles is below a stable region. Therefore, even by polymerization of the polymerizable monomer in such a condition, no monodisperse polymer particles can be obtained.

The desired particle diameter of the final polymer particles, D ($\mu$m), is defined by the following equation (b):

$$D = Ds \times \sqrt[3]{\frac{Mm}{Ms} \times \frac{ds}{dm} \times (X) + 1} \quad (b)$$

where
Ms=weight of seed particles used (solids, g),
Ds=particle diameter of seed particles ($\mu$m),
Mm=weight of monomer used (g),
ds=specific gravity of the seed particle,
dm=specific gravity of a polymer of the monomer,
(X)=polymerization coversion (0 to 1.0).

In practice, assuming that the polymerization conversion is 1.0, the equation (b) can be approximately rewritten as follows:

$$D \approx Ds \times \sqrt[3]{\frac{Mm}{Ms}} \quad (c)$$

In a preferred embodiment of the present invention, therefore, firstly the desired particle diameter of the final polymer particles, D, is fixed, and in order that the desired particle diameter D can be obtained, the particle diameter of seed particles, the amount of seed particles used, and the amount of the monomer used as determined according to the equation (c), secondly a polymerizable monomer is finely dispersed in an aqueous medium to prepare a monomer dispersion in which a number average particle diameter of monomer droplets is not larger than a number average particle diameter of seed particles and, moreover, a number average particle diameter in a semi-stable condition of the monomer droplets, Dm, satisfies the following relation:

$$0.5 \times D < Dm < 3.5 \times D$$

and then, the above monomer dispersion is combined with a seed particle dispersion to make the polymerizable monomer absorbed or adsorbed on the seed particles.

Controlling the number average particle diameter Dm so as to satisfy the relation (a) can be achieved by adding various compounds for adjusting the colloidal stability of monomer droplets to the monomer and/or a dispersion medium.

In order to more decrease the number average particle diameter Dm, it is sufficient to add oily substances to the monomer, said oily substances having a smaller water solubility than the monomer and exerting no adverse influences on polymerization. Oily substances the water solubility of which is not more than 1/100 of that of the monomer are preferred. Representative examples of such oily substances are solvents such as hexane, decane and petroleums, polymerization initiators such as lauroyl peroxide and octanoyl peroxide, and monomers such as 2-ethylhexyl acrylate and stearyl methacrylate.

For example, Dm of a dispersion as prepared by finely dispersing MMA (solubility: 1.7 g/100 g $H_2O$) in water in the presence of a surface active agent is about 26 $\mu$m. When n-hexane (solubility: $1.8 \times 10^{-5}$ g/100 g $H_2O$) is added in an amount of 1 wt% based on the weight of MMA, the resulting number average particle diameter Dm is about 5 $\mu$m. Upon polymerization of MMA under such conditions, monodisperse MMA polymer particles having a particle diameter in a range of 2 to 10 $\mu$m can be formed.

The solubility in water of the oily substance as defined in the present invention is a solubility in pure water at a temperature at which absorption or adsorption onto the seed particles is carried out. The amount of the oily substance dissolved can be measured by a suitable analytical method chosen from known techniques depending on the physical and chemical properties of the oily substance. Examples of such known techniques are the chemical titration method, the infrared spectral method, the ultraviolet spectral method, the absorbance measuring method, the polarographic method, the mass spectral method, the solvent extraction method, and the gas chromatographic method.

In the present invention, when the oily substance is an organic peroxide, its solubility in water is determined by the chemical titration method which is generally used and is of high accuracy.

In this analysis, care should be taken so as to remove the influences of the objective substance emulsified or dispersed in water, for example, by filtration with a membrane filter.

The number average particle diameter in a semi-stable condition, Dm, can be easily determined by preliminary experiments. If, therefore, conditions such as the type and amount of the oily substance for obtaining the desired Dm are previously determined, the desired polymer particles can be easily prepared.

In order to more increase the number average particle diameter in a semi-stable condition, Dm, it is sufficient to add organic solvents completely miscible with water to the polymerizable monomer or its aqueous dispersion, and/or a seed particle dispersion, or to add inorganic metal salts to an aqueous monomer dispersion and/or a seed particle dispersion.

Typical examples of the organic solvent are methanol, ethanol, isopropanol, acetone, tetrahydrofuran, and dimethylformamide (DMF). These organic solvents may be added before finely dispersing the polymerizable monomer.

Typical examples of the inorganic metal salt are NaCl, KCl, $Na_2SO_4$, $MgCl_2$, $CaCl_2$, $CaCO_3$, $Al_2(SO_4)_3$, and $NH_4OH$. Of these compounds, polyvalent metal salts are preferred to use because they are very effective in inreasing Dm even in a small amount.

As in the case of the oily substance as described above, the type and amount of the organic solvent or inorganic metal salt can be determined by preliminary experiments so that the desired Dm can be obtained.

In accordance with the present invention, the number average particle diameter Dm can be determined within the range of 0.1 to 500 $\mu$m, particularly 5 $\mu$m or more, and monodisperse polymer particles having a particle diameter corresponding to Dm can be prepared.

The process of the present invention will hereinafter be explained in detail.

In the first place, a polymerizable monomer is finely dispersed in an aqueous medium to prepare an aqueous monomer dispersion. This aqueous monomer dispersion is immediately combined with a seed particle dispersion, and then monomer droplets and seed particles are brought into contact with each other, for example, by stirring gently to thereby make the polymerizable monomer absorbed or adsorbed on the seed particles, that is, prepare swollen particles.

In preparation of the aqueous monomer dispersion, it is sufficient to finely disperse the polymerizable monomer in an aqueous medium in the presence of a small amount of a surface active agent by usual fine dispersing techniques such as by the use of a homomixer, a supersonic homogenizer, and a high pressure piston pump-type homogenizer.

On standing the above aqueous monomer dispersion, monomer droplets of small diameter disappear as a result of diffusion in water while on the other hand monomer droplets of large diameter swell by diffusion of the monomer. In the swelling process, the number average particle diameter increases abruptly at an earlier stage but after several hours, slowly. In principle, if the aqueous monomer dispersion is allowed to stand for an infinite period, it will separate into two layers of water and the polymerizable monomer. However, in 3 hours after preparation, the aqueous monomer dispersion can be deemed, as described above, to be in a semi-stable condition.

On mixing the aqueous monomer dispersion just after preparation thereof and the seed particle dispersion, swollen particles are formed as a result of absorption or adsorption of the polymerizable monomer on the seed particles.

Contacting the polymerizable monomer with the seed particles is preferably carried out by gently stirring the system to such an extent that the dispersion does not separate.

The contact time between the polymerizable monomer and the seed particles is sufficient to be appropriately determined within the range of about 1 to 48 hours with the time required for the particle diameter to reach a semi-stable condition, for example, 3 hours as a standard.

If the desired number average particle diameter D is smaller than the number average particle diameter in a semi-stable condition Dm, the contact time may be short. On the contrary, if D is larger than Dm, it is preferred for the contact time to be relatively long.

The temperature of the system at which the polymerizable monomer is contacted with the seed particles is not critical as long as it is chosen within a temperature range where the polymerizable monomer does not undergo polymerization (usually 0° to 60° C.). For example, if the system is slowly heated to about 40° C., the contact time can be shortened.

The mixing ratio (by weight) of the polymerizable monomer to the seed particles is usually 6:1 or more, preferably 10:1 or more, and more preferably 20:1 or more. If the mixing ratio is less than 6:1, the seed particles are swollen only to a limited extent and the effects of the present invention cannot be obtained sufficiently.

There is no special limitation to the upper limit of the mixing ratio of the polymerizable monomer to the seed particles. As long as the relation as represented by the equation (a) is satisfied, the seed particles can be easily swollen usually to about 1,000 to 10,000 times the original size.

In the above-prepared dispersion containing swollen particles, the polymerizable monomer is polymerized by the usual procedure in the presence of a polymerization initiator.

Polymerizable monomers which can be used in the present invention are radical polymerizable monomers; a wide variety of monomers from those having a high water solubility to those having a low water solubility can be used as long as they are not completely soluble in water.

Typical examples of the monomer having a high water solubility are acrylonitrile, ethyl methacrylate, vinyl acetate, methyl methacrylate, vinyl chloride, and methyl acrylate.

Typical examples of the monomer having a low water solubility are 2-ethylhexyl acrylate, stearyl acrylate, stearyl methacrylate, and 2,2,3,3-tetrafluoropropyl acrylate.

Other monomers which can be used include aromatic vinyl monomers such as styrene, divinylbenzene and $\alpha$-methylstyrene, ethylenically unsaturated carboxylic acid alkyl esters such as butyl acrylate and butyl methacrylate, and conjugated dienes such as butadiene and isoprene.

These monomers can be used alone or in combination with each other.

As seed particles which are used in the present invention, those swelling on absorbing the polymerizable monomer are preferably used. Typical examples are particles of polymers such as polystyrene, styrene copolymers such as a styrene-butadiene copolymer, acrylate polymers, and vinyl acetate polymers. These seed particles are used in a dispersion form in water, such as a latex, an emulsion and a suspension. In addition, aqueous dispersions of polymers not having swelling properties, highly cross-linkable polymers, and inorganic materials the surface of which is made oleophilic can be used.

It is preferred for the seed particles to have a uniform particle diameter so that the final polymer particles have a uniform particle diameter. The particle diameter of the seed particles can be determined appropriately depending on, e.g., the particle diameter of the final polymer particles and the purpose of use of the final polymer particles. In general, polymer particles having a uniform particle diameter usually in a range of 0.1 to 0.9 $\mu$m as obtained by soap-free polymerization can be used.

As a matter of course, polymer particles as prepared by the process of the present invention can be used as seed particles to prepare polymer particles having a much larger particle diameter.

Seed polymer particles having a uniform particle diameter can be prepared by techniques such as the method described in A. R. Goodall et al., *J. Polym. Sci. Polym. Chem. Edition*, Vol. 15, page 2193 (1977).

More specifically, uniform seed particles having a standard deviation falling within a range of 10% from a number average particle diameter are preferably used. Use of such uniform seed particles permits to prepare monodisperse polymer particles.

The polymerization initiator that is used in the present invention is preferably an oil-soluble polymerization initiator. Water-soluble polymerization initiators are not preferred in that they tend to cause polymerization of monomers other than those of swollen particles, thereby producing polymer particles having a broad particle diameter distribution.

Except for cases where an oil-soluble polymerization initiator having high oleophilic properties is dissolved in the polymerizable monomer and used for the purpose of decreasing Dm, and where in order to make monomers not exhibiting affinity to seed particles (e.g., fluorine-containing monomers) absorbed or adsorbed on seed particles, an oil-soluble polymerization initiator having high oleophilic properties is previously finely dispersed and absorbed or adsorbed on the seed particles, it is preferred to use oil-soluble polymerization initiators having a water solubility of 0.001 to 0.2 g/100 g $H_2O$.

If the water solubility of the oil-soluble polymerization initiator is too small, it takes an undesirably long time for the polymerization initiator to be absorbed in the seed particles because fine droplets of the polymerization initiator are of high stability. On the other hand, if the water solubility of the oil-soluble is too large, the fine droplets of the polymerization initiator is seriously short in life because of their instability. Therefore it is difficult to prepare an aqueous dispersion of the polymerization initiator in which the number average particle diameter of droplets is not larger than that of the seed particles.

The water solubility of the polymerization initiator is determined in the same manner as described above in connection with the oily substance to control Dm.

Oil-soluble polymerization initiators having a water solubility of 0.001 to 0.2 g/100 g $H_2O$ which are preferably used in the present invention include organic peroxides such as 3,5,5-trimethylhexanoyl peroxide, tert-butylperoxy 2-ethylhexanoate, and di-tert-butyl peroxide, and azo compounds such as azobisisobutyronitrile, and azobiscyclohexanecarbonitrile.

If the oil-soluble polymerization initiator is in a solid form such as powder, it is preferred that the polymerization initiator be dissolved in an inert organic solvent such as toluene and cyclohexanone.

In the case of oil-soluble polymerization initiators having a water solubility of more than 0.2 g/100 g $H_2O$, it is necessary to add a dispersion aid in an amount of not less than 0.1 part by weight per 100 parts by weight of the polymerization initiator because such polymerization initiators are difficult to finely disperse. Dispersion aids which can be used for that purpose include inert oil-soluble substances having a water solubility of not less than 0.001 g/100 g $H_2O$. Typical examples are n-hexane, heptane, octane, and dioctyl 1-chlorododecaneadipate.

Typical example of the oil-soluble polymerization initiator having a water solubility of not less than 0.2 g/100 g $H_2O$ are tert-butylperoxy acetate, tert-butylperoxy isobutylate, tert-butylperoxy pivalate, tert-butyl hydroperoxide, acetyl peroxide and isobutyryl peroxide.

In the process of the present invention, the oil-soluble polymerization initiator may be first mixed with the polymerizable monomer and then finely dispersed in an aqueous medium. In this case, however, the polymerizable monomer may sometimes undergo polymerization due to heat generated during the dispersing process. It is therefore preferred that the oil-soluble polymerization initiator be finely dispersed and added to the seed particle dispersion independently from the polymerizable monomer. Preferably, therefore, the polymerizable monomer is finely dispersed in an aqueous medium in such a manner a number average particle diameter of the resulting monomer droplets is not larger than a number average particle diameter of seed particles, thereby preparing a monomer dispersion, and separately the oil-soluble polymerization initiator is finely dispersed in an aqueous medium in such a manner that a number average particle diameter of the resulting droplets is not larger than a number average particle diameter of seed particles, thereby preparing a polymerization initiator dispersion and, thereafter, the two dispersions are added to a seed particle dispersion.

More preferably, the above polymerization initiator dispersion is first combined with the seed particle dispersion to thereby make the polymerization initiator absorbed or adsorbed on the seed particles, and then the above monomer dispersion is combined with the above mixture to thereby make the polymerizable monomer absorbed or adsorbed on the seed particles.

In a more preferred embodiment of the present invention, therefore, the desired particle diameter of the final polymer particles, D, is fixed, and in order that the desired particle diameter D can be obtained, the particle diameter of seed particles, the amount of seed particles used, and the amount of the monomer used are determined according to the equation (c), an oil-soluble polymerization initiator is finely dispersed in an aqueous medium in such a manner that a number average particle diameter of the resulting droplets is not larger than a number average particle diameter of seed particles, thereby preparing a polymerization initiator dispersion, this polymerization initiator dispersion is combined with a seed particle dispersion to thereby make the polymerization initiator absorbed or adsorbed on the seed particles, a polymerizable monomer is finely dispersed in an aqueous medium in such a manner that a number average particle diameter of the resulting monomer droplets is not larger than a number average particle diameter of seed particles and, moreover, a number average particle diameter in a semi-stable condition of the monomer droplets, Dm, satisfies the following equation:

$$0.5 \times D < Dm < 3.5 \times D$$

(wherein D is the desired particle diameter of the final polymer particles), thereby preparing a monomer dispersion, this monomer dispersion is combined with the seed particle dispersion to thereby make the polymerizable monomer absorbed or adsorbed on the seed particles, and the polymerizable monomer is polymerized.

When a monomer mixture containing 40 to 100 wt% of one or more of the monomers represented by the general formula (I):

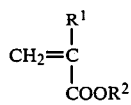

(wherein $R^1$ is a hydrogen atom or a methyl group, and $R^2$ is an alkyl group having 6 to 18 carbon atoms) is used as the polymerizable monomer of the present invention, there can be obtained an aqueous dispersion of fine polymer particles having good standing stability because the polymer has a specific gravity nearly equal to that of an aqueous medium.

The proportion of the monomer(s) of the general formula (I) is 40 to 100 wt%, preferably 60 to 97 wt% and more preferably 70 to 95 wt% based on the total weight of all monomers.

Representative examples of the monomers represented by the general formula (I) are 2-ethylhexyl acrylate ($R^2=C_8$), 2-ethylhexyl methacrylate ($R^2=C_8$), lauryl acrylate ($R^2=C_{12}$), lauryl methacrylate ($R^2=C_{12}$), tridecyl acrylate ($R^2=C_{13}$), tridecyl methacrylate ($R^2=C_{13}$), stearyl acrylate ($R^2=C_{18}$) and stearyl methacrylate ($R^2=C_{18}$).

If in the general formula (I) the number of carbon atoms of $R^2$ is less than 6, the specific gravity of the resulting polymer is greater than that of water and thus the desired aqueous polymer particle dispersion cannot be prepared. On the other hand, if the number of carbon atoms of $R^2$ is more than 18, the resulting monomers cannot be made absorbed on seed particles.

As other comonomers constituting the monomer mixture, any monomers copolymerizable with the monomers of the general formula (I) can be used. In particular, aromatic vinyl monomers and ethylenically unsaturated carboxylic acid alkyl esters are preferred. Representative examples of the comonomer are styrene, α-methylstyrene, p-methylstyrene, divinylbenzene, butadiene, isoprene, vinylidene chloride, vinyl acetate, acrylonitrile, methyl acrylate, methyl methacrylate, ethyl acrylate, ethyl methacrylate, butyl acrylate, butyl methacrylate, ethylene glycol diacrylate, ethylene glycol dimethacrylate, acrylamide, methacrylamide, glycidyl acrylate, glycidyl methacrylate, N-methylolacrylamide, N-methylolmethacrylamide, 2-hydroxyethyl acrylate, 2-hydroxyethyl methacrylate, diallyl phthalate, allyl acrylate, allyl methacrylate, acrylic acid, methacrylic acid, itaconic acid and fumaric acid. Particularly preferred monomers are styrene, divinylbenzene, methyl methacrylate, and ethylene glycol dimethacrylate.

The monomers of the general formula (I) and other monomers copolymerizable therewith can be used each alone or in combination with each other.

If the proportion of the monomer of the general formula (I) in the monomer mixture is less than 40 wt%, the resulting aqueous polymer particle dispersion undesirably readily undergoes sedimentation; the desired aqueous polymer particle dispersion cannot be obtained.

The composition of the monomer mixture is determined so that the specific gravity of the resulting polymer is nearly equal to 1, usually 1.020 to 0.980, preferably 1.010 to 0.990, and more preferably 1.005 to 0.995.

A typical monomer composition producing a polymer having a specific gravity of 1.000 comprises, with the monomer of the general formula (I) as 2-ethylhexyl acrylate and using styrene and divinylbenzene as the comonomers, 88 parts by weight of 2-ethylhexyl acrylate, 6 parts by weight of styrene, and 6 parts by weight of divinylbenzene.

Moreover, in accordance with the process of the present invention, monodisperse, large-sized fluorine-containing polymer particles can be prepared using a monomer mixture containing a fluorine-containing monomer as the polymerizable monomer of the present invention. In this case, to accelerate absorption or adsorption of the fluorine-containing monomer on seed particles, it is preferred that an oleophilic substance be first made absorbed on the seed particles and then, after combining a fluorine-containing monomer dispersion with the seed particle dispersion to make the monomer absorbed or adsorbed on the seed particles, the fluorine-containing monomer is polymerized.

The fluorine-containing monomer as used herein is a radical polymerizable monomer having a fluorine content of not less than 25 wt%, preferably not less than 35 wt%.

Preferred examples of the fluorine-containing monomer are fluoroalkyl acrylates or methacrylates, such as 2,2,2-trifluoroethyl acrylate, 2,2,3,3-tetrafluoropropyl acrylate, 2,2,3,3,4,4,5,5-octafluoroamyl acrylate, and 1H, 1H, 2H, 2H-heptadecafluorodecyl acrylate. In addition, trifluorochloroethylene, vinylidene fluoride, ethylene trifluoride, ethylene tetrafluoride, trifluoropropylene, hexafluoropropene, and hexafluoropropylene can be used. As monomers not containing fluorine to be used in combination with the above fluorine-containing monomer, any monomers copolymerizable with the fluorine-containing monomer can be used. Typical examples of the comonomer not containing fluorine are aromatic vinyl compounds such as styrene, α-methylstyrene, p-methylstyrene, halogenated styrene, divinylbenzene and 4-vinylpyridine, vinyl esters such as vinyl acetate and vinyl propionate, unsaturated nitriles such as acrylonitrile, and ethylenically unsaturated carboxylic acid alkyl esters such as methyl acrylate, methyl methacrylate, ethyl acrylate, ethyl methacrylate, butyl acrylate, butyl methacrylate, 2-ethylhexyl acrylate, 2-ethylhexyl methacrylate, lauryl acrylate, lauryl methacrylate, ethylene glycol diacrylate, ethylene glycol dimethacrylate, and N,N-dimethylaminoethyl methacrylate.

Conjugated diolefins such as butadiene and isoprene can also be used.

In addition, acrylamide, methacrylamide, glycidyl acrylate, glycidyl methacrylate, N-methylolacrylamide, N-methylolmethacrylamide, 2-hydroxyethyl acrylate, 2-hydroxyethyl methacrylate, allyl acrylate, allyl methacrylate, and the like can be used depending on the purpose of use. If necessary, acrylic acid, methacrylic acid, itaconic acid, fumaric acid and the like can be used in such an amount not to prevent swell polymerization.

If a polyfunctional vinyl monomer such as divinylbenzene, ethylene glycol diacrylate and ethylene glycol dimethacrylate is used in combination in an amount of not less than 0.5 wt%, preferably 1 to 40 wt% based on the total weight of all monomers, fusion of soft polymer particles is prevented and the hardness and stiffness of the polymers are increased. Thus the final polymer particles are preferably used in the field of, e.g., lubricants.

The proportion of the fluorine-containing monomer in the monomer mixture is determined so that the fluorine content of the ultimate polymer is not less than 3 wt%, preferably not less than 10 wt%, and more preferably not less than 20 wt%. If the fluorine content of the polymer is less than 3 wt%, particle aggregation is improved only to a limited extent.

The oleophilic substance to be absorbed on seed particles is a substance having a water solubility of preferably not more than 0.02 g/100 g H$_2$O, more preferably 0.001 to 0.02 g/100 g H$_2$O, and a molecular weight of not more than 5,000, preferably not more than 500. Typical examples of the oleophilic substance are 1-chlorododecane, hexane, dioctyl adipate, stearyl methacrylate, and monomers which are also capable of acting as polymerization initiators, such as dioctanoyl peroxide, lauroyl peroxide, and 3,5,5-trimethylhexanoyl peroxide.

A method of making the oleophilic substance absorbed on seed particles is not critical. Usually the oleophilic substance is dispersed in water by the use of, e.g., soap and added to water containing seed particles. It is also possible to accelerate the transfer of the oleophilic substance to the seed particles by adding solvents miscible with water, such as acetone.

The process of the present invention permits preparation of monodisperse fluorine-containing polymer particles having a particle diameter of 1 to 100 μm, a particle diameter distribution that the standard deviation is not more than 10% from the average particle diameter, and a fluorine content of not more than 3 wt%.

In the process of the present invention, as the polymerizable monomer, a monomer mixture of a monomer having a water solubility of 0.001 to 0.1 g/100 g H$_2$O (first monomer) and a monomer having a water solubility of more than 0.1 g/100 g H$_2$O (second monomer) can be used. In this case, the first monomer is finely dispersed in an aqueous medium so as to satisfy the above-described requirements and then combined with a seed particle dispersion to thereby make the first monomer absorbed or adsorbed on seed particles. Subsequently the second monomer is added thereto as such, preferably after finely dispersing in an aqueous medium and more preferably so as to satisfy the above-described requirements. Upon polymerization of the monomer mixture, the desired polymer particles can be prepared.

Examples of the first monomer are aromatic vinyl compounds such as styrene, α-methylstyrene, p-methylstyrene, and divinylbenzene, ethylenically unsaturated carboxylic acid alkyl esters such as butyl acrylate, butyl methacrylate, 2-ethylhexyl acrylate, 2-ethylhexyl methacrylate, lauryl acrylate, lauryl methacrylate, and trimethylolpropane trimethacrylate, and conjugated diolefins such as butadiene and isoprene. These monomers can be used alone or in combination with each other.

Examples of the second monomer are vinylpyridine, vinylidene chloride, vinyl acetate, acrylonitrile, methyl acrylate, methyl methacrylate, ethyl acrylate, ethyl methacrylate, ethylene glycol diacrylate, ethylene glycol dimethacrylate, acrylamide, methacrylamide, glycidyl acrylate, glycidyl methacrylate, N-methylolacrylamide, N-methylolmethacrylamide, 2-hydroxyethyl acrylate, 2-hydroxyethyl methacrylate, diallyl phthalate, allyl acrylate, allyl methacrylate, acrylic acid, methacrylic acid, itaconic acid, and fumaric acid.

For the purpose of preventing formation of new particles in an aqueous phase during the polymerization process, it is preferred that a monomer having a high rate of polymerization, such as divinylbenzene, acrylonitrile and vinyl chloride, be used as at least a part of the monomer mixture.

The aqueous dispersion of the first monomer is combined with the seed particle dispersion and gently stirred usually over more than 1 hour until the first monomer droplets are absorbed or adsorbed on the seed particles. The polymerization initiator may be made absorbed or adsorbed on the seed particles simultaneously with the first monomer, but preferably it is made absorbed or adsorbed on the seed particles prior to the introduction of the first monomer. In this way, swollen particles with the first monomer and the polymerization initiator absorbed or adsorbed thereon are prepared.

Then the dispersion of the second monomer is added to thereby make the second monomer absorbed or adsorbed on the above swollen particles.

Thereafter the temperature of the system is raised to cause polymerization. The polymerization temperature is usually 40° to 90° C., preferably 50° to 80° C. although it varies depending on the type of the polymerization initiator.

In the process of the present invention, particles may be formed and grow in an aqueous phase regardless of seed particles depending on the monomer composition during the polymerization process. In order to prevent the formation of new particles separately from the seed particles, known water-soluble polymerization inhibitors such as hydroxylamine, ferric chloride, potassium dichromate, and sodium sulfite can be added at the time of polymerization.

To increase the dispersion stability of swollen particles or polymer particles, it is preferred to use protective colloid. Typical examples of the protective colloid are water-soluble polymers such as polyvinyl alcohol, polyvinyl pyrrolidone and methyl cellulose. This protective colloid is sufficient to be added in a commonly used amount.

It is necessary to use a dispersion stabilizer to increase the stability of dispersed particles during the polymerization process. As this dispersion stabilizer, anionic and nonionic surface active agents, and organic and inorganic suspension protective agents, for example, can be used. When, however, a surface active agent is used, it is necessary to control the concentration of the surface active agent to below the critical micelle concentration. A preferred example of the dispersion stabilizer is polyvinyl alcohol having a degree of saponification of 75 to 95% and a degree of polymerization of 500 to 3,000.

Polymer particles prepared by the process of the present invention have many advantages. One of the advantages is that the polymer particles do not contain gigantic or extremely small particles; they are of high monodisperse. Another advantage is that the polymer particles are not deformed but in a spherical form because a swelling aid is not used in preparation thereof.

The polymer particles prepared by the process of the present invention, which have advantages as described above, can find many applications. They are useful as, e.g., a standard sample for microscopic examination, a model material for investigation of, e.g., separation, fluid flow, centrifugal separation, rate of diffusion, and dust, a carrier for medicines for diagnosis of living body, a carrier for immobilized enzyme, a powder ink, a toner for electrostatic development, a paint, a powdered lubricant, a microcapsule, a spacer material for protection of microcapsules for pressure-sensitive copying paper, a spacer for liquid crystal cell, a plastic pigment for coated paper, a plastic pigment for adhesive, a binder for ceramics, a base polymer particle for impact resistant resin, a plastic pigment for cosmetics, and a column filler for ion chromatography.

The present invention is described below in greater detail with reference to the following examples although it is not limited thereto. All parts and percents are by weight unless otherwise indicated.

EXAMPLE 1

| | |
|---|---|
| Styrene (water solubility: 0.03 g/100 g H$_2$O) | 100 parts |
| Water | 200 parts |
| Sodium laurylsulfate | 1.5 parts |
| Benzoyl peroxide (dissolved in styrene) | 2 parts |

These ingredients were mixed with a stirrer and then finely dispersed for 30 minutes by the use of a 300 W supersonic dispersing machine to prepare a styrene dispersion in which the maximum particle diameter of styrene droplets was 0.4 μm. The particle diameter was measured with a dynamic light-scattering analyzer (Model N4 manufactured by Callter Co.).

The above dispersion was added to 300 parts of water. While gently stirring the mixture at ordinary temperature, optical micrographs were taken from time to time. Using these micrographs, changes in number average particle diameter of the styrene droplets were measured. The results are shown in FIG. 1.

As can be seen from the graph of FIG. 1, a number average particle diameter on standing for 3 hours under the above conditions, Dm, was 3.2 μm.

Using the same ingredients as used above, a styrene dispersion was prepared in the same manner as above. 303.5 parts of the dispersion (styrene content: 100 parts; maximum particle diameter: 0.4 μm) was mixed with 200 parts of water containing a monodisperse polystyrene dispersion (polystyrene content: 7 parts; number average particle diameter: 0.40 μm) which had been prepared by soap-free polymerization. The mixture was slowly stirred for 3 hours to bring styrene droplets into contact with seed particles.

Then 100 parts of a 10% aqueous solution of polyvinyl alcohol (Gosenol GH 20 produced by Nippon Gosei Kagaku Co., Ltd.) was added to the above mixture. The system was heated to 80° C., and upon polymerization of the monomer at 80° C. for 8 hours, monodisperse polymer particles having a number average particle diameter of 1.0 μm and a standard deviation of 10% in the particle diameter distribution were obtained.

The above results are shown in Table 1.

EXAMPLES 2 TO 5, AND COMPARATIVE EXAMPLES 1 TO 3

The procedure of Example 1 was repeated wherein the amount (as solids) of polystyrene particles being used as seed particles, the desired number average particle diameter D, and the contact time between styrene droplets and seed particles were changed as shown in Table 1.

The polymer particles thus prepared were measured for a number average particle diameter and a standard deviation in the particle diameter distribution. The results are shown in Table 1.

TABLE 1

| Run No. | Amount of Seed Particles (parts) | Desired Particle Diameter (D) (μm) | Contact Time (hr) | Polymer Particles Particle Diameter (μm) | Deviation (%) |
|---|---|---|---|---|---|
| Example 1 | 7 | 1.0 (3.3) | 3 | 1.0 | 10 |
| Example 2 | 1 | 1.9 (1.7) | 3 | 1.9 | 4 |
| Example 3 | 0.3 | 2.8 (1.1) | 3 | 2.8 | 2 |
| Example 4 | 0.1 | 4.0 (1.8) | 3 | 4.0 | 8 |
| Example 5 | 0.03 | 6.0 (0.53) | 12 | 6.0 | 13 |
| Comparative Example 1 | 10 | 0.9 (3.7) | 3 | 0.7 | 70 |
| Comparative Example 2 | 0.01 | 8.6 (0.4) | 168 | 7.1 | 120 |
| Comparative Example 3 | 0.003 | 12.9 (0.2) | 168 | 7.9 | 140 |

Note:
(1) The desired particle diameter D was determined according to the equation (c).
(2) The values in the parentheses in the column of the desired number average particle diameter D indicate Dm/D ratios.

As can be seen from the results of Table 1, monodisperse polymer particles could be obtained in Examples 1 to 5 while on the other hand, in Comparative Examples 1 to 3, only polymer particles having a broad particle diameter distribution were obtained; no monodisperse polymer particles could be obtained.

In Comparative Example 1, at a stage at which the contact time between monomer droplets and seed particles is 20 minutes, swollen particles having a nearly uniform particle diameter were obtained. However, on standing them for 3 hours, diffusion and precipitation of styrene between the swollen particles occurred, thereby producing swollen particles having a broad particle diameter distribution in a range of 0.6 to 1.5 μm. Upon polymerization of the monomer in that condition, polymer particles having a broad particle diameter distribution in a range of 0.5 to 2.0 μm were obtained.

When the monomer was polymerized at the stage that the contact time between styrene droplets and seed particles was 20 minutes, the particle diameter distribution was broadened, and polymer particles obtained also had a broad particle diameter distribution in a range of 0.6 to 2.0 μm.

In Comparative Examples 2 and 3, at the stage that the contact time between styrene droplets and seed particles was 3 hours, a large amount of styrene droplets remained unabsorbed on the seed particles. These styrene droplets did not disappear even when the system was slowly stirred for two days and nights. Some styrene droplets remaining unabsorbed became larger in diameter than those absorbed on the seed particles and even when allowed to stand for one week, they were not absorbed on the seed particles. Upon polymerization of the monomer in that condition, polymer particles having a broad particle diameter distribution in a range of 5 to 20 μm in Comparative Example 2 and in a range of 5 to 30 μm in Comparative Example 3 were obtained.

EXAMPLES 6 TO 8, AND COMPARATIVE EXAMPLES 4 AND 5

| | |
|---|---|
| MMA (water solubility: 1.7 g/100 g H$_2$O) | 100 parts |
| Water | 200 parts |
| Sodium dodecylbenzenesulfonate | 1.0 part |
| Benzoyl peroxide (dissolved in MMA) | 2 parts |

The above ingredients were stirred in the same manner as in Example 1 to prepare a dispersion in which MMA was finely dispersed (maximum particle diameter: 0.7 μm). The number average particle diameter in a semi-stable condition, Dm, was 26 μm.

The procedure of Example 1 was repeated wherein the same MMA dispersion as prepared above (maximum particle diameter: 0.7 μm) was used as a monomer dispersion, a monodisperse polystyrene latex (number average particle diameter: 0.82 μm) prepared by soap-free polymerization was used as seed particle, and the amount (solids) of the seed particles used, the desired number average particle diameter D and the contact time between the the MMA droplets and seed particles were changed as shown in Table 2.

The polymer particles thus prepared were measured for the number average particle diameter and standard deviation in the particle diameter distribution. The results are shown in Table 2.

In Comparative Examples 4 and 5, the particle diameters of swollen particles were not uniform at the stage that the contact time between styrene droplets and seed particles was 3 hours. The polymer particles obtained by polymerization in that condition has broad particle diameter distributions ranging between 2 and 20 μm, and between 3 and 50 μm.

EXAMPLE 9, AND COMPARATIVE EXAMPLE 6

| | |
|---|---|
| 2-Ethylhexyl acrylate (water solubility: 1 × 10$^{-4}$ g/100 g H$_2$O) | 100 parts |
| Water | 200 parts |
| Sodium dodecylbenzenesulfonate | 1.0 part |
| Benzoyl peroxide (dissolved in 2-ethylhexyl acrylate) | 2 parts |

The above ingredients were stirred in the same manner as in Example 1 to prepare a dispersion in which 2-ethylhexyl acrylate was finely dispersed (maximum particle diameter: 0.09 μm). After allowing to stand for 3 hours, the above dispersion was measured for the number average particle diameter in a semi-stable condition, Dm, by the use of a dynamic light-scattering analyzer (Model N4 manufactured by Callter Co.). Dm was 9.32 μm.

The same 2-ethylhexyl acrylate dispersion as prepared above was used as a monomer dispersion, and monodisperse polymethyl methacrylate particles (number average particle diameter: 0.12 μm) were used as seed particles. The amount (solids) of polymethyl methacrylate particles used, the desired number average particle diameter D, and the contact time between 2-ethylhexyl acrylate droplets and seed particles were determined as shown in Table 3.

The polymethyl methacrylate particle dispersion and the seed particle dispersion were combined together,

TABLE 2

| | Amount of Seed Particles | Desired Particle Diameter (D) | Contact Time | Polymer Particles | |
|---|---|---|---|---|---|
| Run No. | (parts) | (μm) | (hr) | Particle Diameter (μm) | Deviation (%) |
| Example 6 | 0.1 | 8.2 (3.2) | 3 | 8.0 | 12 |
| Example 7 | 0.01 | 17.7 (1.5) | 3 | 17.2 | 4 |
| Example 8 | 0.001 | 38.1 (0.7) | 24 | 38.0 | 10 |
| Comparative Example 4 | 1 | 3.8 (6.8) | 3 | 5.1 | 120 |
| Comparative Example 5 | 0.2 | 6.5 (4.0) | 3 | 7.2 | 210 |

Note:
The desired particle diameter D and the values in the parentheses are the same as defined in Table 1.

As can be seen from the results of Table 2, monodisperse polymer particles could be obtained in Examples 6 to 8 while on the other hand in Comparative Examples 4 and 5, polymer particles had a broad particle diameter distribution; no monodisperse polymer particles could be obtained.

and then the system was heated to 75° C. at which the monomer was polymerized.

The polymer particles thus obtained were measured for the number average particle diameter and deviation in the particle diameter distribution. The results are shown in Table 3.

TABLE 3

| | Amount of Seed Particles | Desired Particle Diameter (D) | Contact Time | Polymer Particles | |
|---|---|---|---|---|---|
| Run No. | (parts) | (μm) | (hr) | Particle Diameter (μm) | Deviation (%) |
| Example 9 | 1.4 | 0.5 (0.6) | 3 | 0.51 | 3 |
| Comparative Example 6 | 0.2 | 0.95 (0.3) | 168 | 0.30 | 152 |

Note:
The desired particle diameter D and the values in the parentheses are the same as defined in Table 1.

As can be seen from The results of Table 3, monodisperse polymer particles could be obtained in Example 9 while on the other hand, in Comparative Example 6, the polymer particles obtained had a broad particle diameter distribution; polymer particles having a uniform particle distribution could not be obtained.

In Comparative Example 6, a mixture of uniform swollen particles having a diameter of 0.8 μm and monomer droplets having a broad particle diameter distribution was obtained at the stage that the contact time between monomer droplets and seed particles was 3 hours. Even though the mixture was allowed to stand for one week, the monomer droplets did not disappear. Upon polymerization of the monomer while maintaining the temperature of the system at 75° C. in that condition, only polymer particles having a broad particle diameter distribution in a range of 0.1 to 0.9 μm were obtained.

EXAMPLE 10, AND COMPARATIVE EXAMPLE 7

In this example, swollen particles having a uniform particle diameter of more than 10 μm were prepared using styrene.

| Styrene | 100 parts |
| Water | 200 parts |
| Sodium laurylsulfate | 1.5 parts |
| Benzoyl peroxide (dissolved in styrene) | 2 parts |

These ingredients were dispersed with supersonic waves to prepare a fine dispersion (diameter: less than 0.5 μm).

This dispersion was combined with a mixture of 200 parts of water containing 5 parts of the same polyvinyl alcohol as used in Example 1 and 50 parts of methanol, and then gently stirred. The number average particle diameter of monomer droplets after 3 hours, i.e., Dm was measured with an optical microscope. Dm was 22.5 μm.

The same styrene dispersion as prepared above was used as a monomer dispersion. Monodisperse polystyrene particles having a number average particle diameter of 0.82 μm were used as seed particles. The amount (solids) of the polystyrene particles used, the desired number average particle diameter D, and the contact time between styrene droplets and seed particles were determined as shown in Table 4. After combining the styrene dispersion and the seed particle dispersion, the temperature of the system was raised to 80° C., and polymerization was carried out at 80° C.

The amount of the styrene droplets used was 303.5 parts, and the monodisperse polystyrene particle dispersion was prepared by mixing the polystyrene particles, 5 parts of polyvinyl alcohol, 200 parts of water and 50 parts of methanol.

The polymer particles thus prepared were measured for a number average particle diameter and a deviation in the particle diameter distribution. The results are shown in Table 4.

TABLE 4

| Run No. | Amount of Seed Particles (parts) | Desired Particle Diameter (D) (μm) | Contact Time (hr) | Polymer Particles Particle Diameter (μm) | Polymer Particles Deviation (%) |
| --- | --- | --- | --- | --- | --- |
| Example 10 | 0.03 | 12 (1.8) | 3 | 11.6 | 4 |
| Comparative Example 7 | 0.45 | 5 (4.5) | 3 | 7.2 | 115 |

Note:
The desired particle diameter D and the values in the parentheses are the same as defined in Table 1.

As can be seen from the results of Table 4, monodisperse polymer particles could be obtained in Example 10 while on the other hand, in Comparative Example 7, only polymer particles having a broad particle diameter distribution were prepared; no monodisperse polymer particle could be obtained.

In Comparative Example 7, swollen particles having a broad particle diameter distribution in a range of 4 to 7 μm were formed at the stage that the contact time was 1 hour. At the stage that the contact time was 3 hours, swollen particles had a broad particle diameter in a range of 3 to 20 μm. Upon polymerization of the monomer in that condition, only polymer particles having a broad particle diameter distribution in a range of 3 to 30 μm were obtained.

EXAMPLE 11

303.5 parts of the same styrene dispersion as prepared in Example 10 was mixed with a mixture of 2.0 parts of the monodisperse polystyrene particles having a number average particle diameter of 11.6 μm, 5 parts of polyvinyl alcohol, 200 parts of water and 50 parts of methanol. On slowly stirring the resulting mixture for 12 hours, monodisperse swollen particles having a number average particle diameter of about 40 μm were obtained.

50 parts of a 10% aqueous solution of polyvinyl alcohol and 5 parts of a 10% aqueous solution of ferric chloride were futher added. Upon polymerization of the monomer at 70° C. for 8 hours, monodisperse polystyrene particles having a number average particle diameter of 42 μm and a deviation value of 11% were obtained in a polymerization yield of 97%.

In the above styrene dispersion, the number average particle diameter in a semi-stable condition, Dm, was 22.5 μm, the desired number average particle diameter D was 42.0 μm, and Dm/D was 0.54.

EXAMPLE 12

In this example, polymethyl methacrylate particles having a number average particle diameter smaller than that of the usual particles were prepared.

| MMA | 100 parts |
| Isoparaffin (Shellsol 71, produced by Shell Petroleum Co., Ltd.; water solubility: less than $1 \times 10^{-5}$ g/100 g $H_2O$) | 0.5 part |
| Benzoyl peroxide (dissolved in MMA) | 2 parts |

These ingredients were mixed, and then added to a mixture of 200 parts of water and 2 parts of sodium laurylsulfate. The resulting mixture was finely dispersed with supersonic waves to prepare a MMA dispersion (maximum particle diameter: less than 0.5 μm).

Dm of the above MMA dispersion as determined in the same manner as in Example 1 was 2.1 μm. The desired number average particle diameter D was 2.5 μm and Dm/D was 0.84.

The above MMA dispersion was again prepared, and added to a mixture of 1.4 parts of monodisperse polystyrene particles (number average particle diameter: 0.60 μm), 5 parts of polyvinyl alcohol, and 300 parts of water. On stirring the resulting mixture for 3 hours, swollen particles having a uniform particle diameter were obtained. It was then added to 50 parts of a 10% aqueous solution of polyvinyl alcohol. Upon polymerization of the monomer at 70° C. for 5 hours, uniform polymer particles having a number average particle diameter of 2.5 μm and a standard deviation of 7% were obtained.

EXAMPLE 13

In this example, polymer particles having a larger particle diameter than the usual one were prepared using 2-ethylhexyl acrylate.

| | |
|---|---|
| 2-Ethylhexyl acrylate | 100 parts |
| Water | 200 parts |
| Sodium laurylsulfate | 1 part |
| Benzoyl peroxide (dissolved in 2-ethylhexyl acrylate) | 2 parts |

These ingredients were finely dispersed by the use of a supersonic dispersing machine to prepare a 2-ethylhexyl acrylate dispersion (maximum particle diameter: less than 0.2 μm).

The above 2-ethylhexyl acrylate dispersion was added to a mixture of 7 parts of polyvinyl alcohol, 3 parts of calcium chloride and 200 parts of water, and slowly stirred. After allowing to stand for 3 hours in the same manner as in Example 1, the number average particle diameter, i.e., Dm, was measured. Dm was 0.8 μm. In this example, the desired number average particle diameter D is 0.92 μm and Dm/D is 0.87.

The above dispersion was again prepared, and then added to a mixture of 1 part of a monodisperse styrene-butadiene latex (number average particle diameter: 0.20 μm), 7 parts of polyvinyl alcohol, 3 parts of calcium chloride and 200 parts of water. On slowly stirring the resulting mixture for 3 hours, a dispersion of monodisperse swollen particles having a number average particle diameter of about 1 μm was obtained.

The temperature of the mixture was raised to 70° C. Upon polymerization of the monomer for 5 hours, uniform polymer particles having a number average particle diameter of 0.92 μm and a standard deviation of 6% were obtained.

EXAMPLE 14

303 parts of the same methyl methacrylate dispersion as in Example 6 was added to a mixture of a dispersion of 1.0 part of polystyrene particles having a number average particle diameter as obtained in Example 11, 5 parts of a 10% aqueous solution of polyvinyl alcohol, 20 parts of a 1% aqueous solution of ferric chloride, 200 parts of water and 70 parts of acetone. On slowing stirring the resulting mixture of 10° C. for 48 hours, monodisperse swollen particles having a number average particle diameter of about 200 μm were obtained.

Upon polymerization of the monomer at 70° C. for 8 hours, monodisperse polymethyl methacrylate particles having a number average particle diameter of 186 μm and a standard deviation of 7% were obtained.

In the above methyl methacrylate dispersion, the number average particle diameter in a semi-stable condition, Dm, is 150 μm, the desired number average particle diameter is 194 μm, and Dm/D is 0.77.

EXAMPLE 15

| | |
|---|---|
| Tert-butylperoxy 2-ethylhexanoate (Perbutyl O, produced by Nippon Yushi Co., Ltd.) | 2 parts |
| Sodium laurylsulfate | 0.15 part |
| Water | 20 |

These ingredients were stirred with supersonic waves to prepare a dispersion of Perbutyl O (maximum particle diameter: 0.5 μm; Dm: 1.0 μm). This dispersion was added to 40 parts of a monodisperse polystyrene latex (number average particle diameter: 0.80 μm; solids content: 5%). The mixture was slowly stirred at 30° C. over 12 hours to thereby make droplets of Perbutyl O absorbed on polystyrene paticles as seed particles.

| | |
|---|---|
| Styrene | 90 parts |
| Divinylbenzene | 10 parts |
| Sodium laurylsulfate | 2.85 parts |
| Water | 342 parts |

These ingredients were finely dispersed with supersonic waves to prepare a dispersion in which a particle diameter of droplets of the styrene-divinylbenzene mixture was less than 0.5 μm. This dispersion was added to the above seed particle dispersion. By slowing stirring the resulting mixture at 30° C. for 12 hours, the monomer mixture was made absorbed on the seed particles.

Thereafter, 100 parts of a 10% aqueous solution of polyvinyl alcohol (Gosenol GH20 produced by Nippon Gosei Kagaku Co., Ltd.) was added. The temperature was raised to 80° C. to start polymerization. Polymerization was almost completed in 4 hours. Almost no aggregation occurred and the formation of new particles in an aqueous layer was not observed at all.

The polymer particles thus obtained were examined with a scanning-type electron microscope. It was confirmed that the particles were nearly spherical in shape, the number average particle diameter was 2.8 μm, and the deviation of particle diameter was 5%; the particles had a greatly uniform particle diameter.

Figure 2:
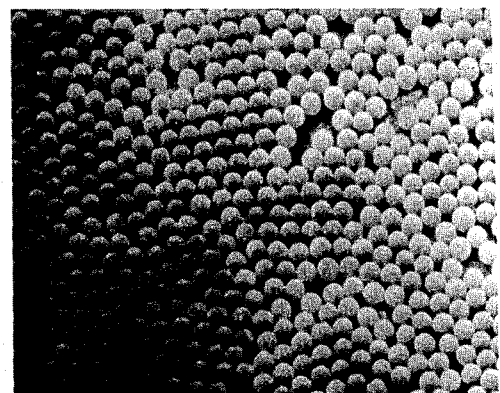
FIG. 2 is a scanning-type electron micrograph of polymer particles as obtained in Example 15.

A scanning-type electron micrograph of the polymer particles is shown in FIG. 2 (×1200).

REFERENCE EXAMPLE 1

| | |
|---|---|
| Perbutyl O (same as used in Example 15) | 2 parts |
| Styrene | 90 parts |
| Divinylbenzene | 10 parts |
| Sodium laurylsulfate | 3 parts |
| Water | 400 parts |

These ingredients were finely dispersed with supersonic waves to such an extent that the maximum particle diameter of the resulting oil droplets was less than 0.5 μm. During this process, the temperature of the dispersion rised to 60° C. as a result of heat generation due to the dispersion operation.

The dispersion thus prepared was added to 2 parts (calculated as solids) of a monodisperse polystyrene latex (solids content: 5%) having a number average particle diameter of 0.80 μm. The resulting mixture was slowly stirred at 30° C. over 24 hours to make the monomer and polymerization initiator droplets absorbed on the seed particles. Even at the end of the period, the droplets did not disappear. Even though the mixture was stirred for additional 48 hours, the droplets did not disappear.

Thereafter, 100 parts of a 10% aqueous solution of polyvinyl alcohol was added to the above mixture. The temperature of the system was raised to 80° C., and upon polymerization of the monomer at that temperature for 4 hours, polymerization was nearly completed.

The polymer particles thus obtained were examined with a scanning-type electron microscope. It was found that the polymer particles were composed of particles having a uniform particle diameter of about 2.7 μm and particles having an uneven particle diameter ranging from 0.5 to 2 μm.

Figure 3:
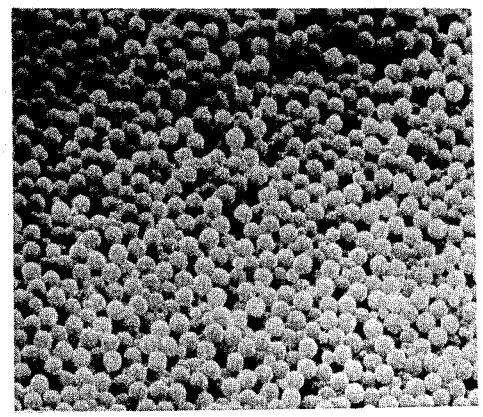
FIG. 3 is a scanning-type electron micrograph of polymer particles as obtained in Reference Example 1.

A scanning-type electron micrograph of the polymer particles is shown in FIG. 3 (×1200).

EXAMPLE 16

| | |
|---|---|
| 3,5,5-Trimethylhexanoyl peroxide (Perloyl 355 produced by Nippon Yushi Co., Ltd.) | 20 parts |
| Sodium laurylsulfate | 0.5 part |
| Water | 100 parts |

These ingredients were finely dispersed with supersonic waves to such an extent that the maximum particle diameter of droplets was less than 0.6 μm. The dispersion thus prepared was added to 50 parts of an aqueous dispersion (solids content: 2%) of polystyrene particles having a number average particle diameter of 0.9 μm. The resulting mixture was slowly stirred at 30° C. for 24 hours to thereby make Perloyl 355 absorbed on the polystyrene particles as seed particles.

| | |
|---|---|
| Styrene (water solubility: 2 × 10$^{-2}$ g/100 g H$_2$O) | 300 parts |
| Sodium laurylsulfate | 3.75 parts |
| Water | 500 parts |

These ingredients were finely dispersed with a Mantongaurin homogenizer to prepare a styrene dispersion (number average particle diameter: less than 0.8 μm; Dm: 3.2 μm). This styrene dispersion was added to the above seed particle dispersion, and the resulting mixture was slowly stirred at 30° C. for 10 hours to make the styrene absorbed on the seed particles. In this way, swollen particles having a uniform particle diameter of 6.0 μm were prepared.

| | |
|---|---|
| Butyl acrylate (water solubility: 0.11 g/100 g H$_2$O) | 300 parts |
| Sodium laurylsulfate | 3.75 parts |
| Water | 500 parts |

These ingredients were finely dispersed with a Mantongaurin homogenizer to prepare a butyl acrylate dispersion (number average particle diameter: less than 0.8 μm; Dm: 9 μm). This dispersion was added to the above seed particles, and the resulting mixture was slowly stirred at 30° C. for 5 hours to thereby make the butyl acrylate absorbed on the seed particles.

| | |
|---|---|
| Acrylonitrile (water solubility: 8 g/100 g H$_2$O) | 400 parts |
| Sodium laurylsulfate | 7.5 parts |
| Water | 100 parts |
| n-Hexane | 40 parts |

These ingredients were finely dispersed with a Mantongaurin homogenizer to prepare an acrylonitrile dispersion (number average particle diameter: less than 0.5 μm; Dm: 13 μm). This acrylonitrile dispersion was added to the above dispersion, and the resulting mixture was slowly stirred at 30° C. for 42 hours to thereby make the acrylonitrile absorbed on the seed particles.

The thus-prepared swollen seed particles had a uniform particle diameter of about 9 μm. To the dispersion thus obtained was added 1,000 parts of a 10% aqueous solution of polyvinyl alcohol, and then the resulting mixture was heated to 70° C. to start polymerization. Polymerization was nearly completed in 6 hours. Optical microscopic examination confirmed that the polymer particles were nearly spherical particles having a number average particle diameter of 8.6 μm and a standard deviation of 7%.

EXAMPLE 17

| | |
|---|---|
| Tert-butylperoxy 2-ethylhexanoate (Perbutyl O produced by Nippon Yushi Co., Ltd.) | 30 parts |
| Sodium laurylsulfate | 2 parts |
| Water | 150 parts |

These ingredients were finely dispersed with a Mantongaurin homogenizer to prepare a dispersion in which the particle diameter of droplets was less than 0.5 μm. This dispersion was immediately added to 50 parts of a monodisperse polystyrene latex (number average particle diameter: 0.83 μm), and the resulting mixture was slowly stirred at 20° C. for 24 hours to make the droplets of Perbutyl O absorbed on the seed particles.

| | |
|---|---|
| Styrene | 700 parts |
| Sodium laurylsulfate | 8 parts |
| Water | 1,000 parts |

These ingredients were finely dispersed with a Mantongaurin homogenizer to prepare a styrene dispersion in which the maximum particle diameter of droplets of styrene was less than 0.5 μm. This dispersion was divided into two portion. Each portion was added over 12 hours to make the styrene droplets absorbed on the seed particles.

| | |
|---|---|
| Acrylonitrile | 800 parts |
| 1-Chlorododecane | 20 parts |
| Sodium laurylsulfate | 10 parts |
| Water | 2,000 parts |

These ingredients were finely dispersed with a Mantongaurin homogenizer to prepare a dispersion in the maximum particle diameter of acrylonitrile/1-chlorodedocane droplets was less than 0.7 μm.

This dispersion was divided into four portions. Each portion was added to the above seed particles to make the monomer absorbed on the seed particles.

Optical microscopic examination showed that oil droplets comprising swollen seen particles had a uniform particle diameter of about 9 μm.

To the above-prepared dispersion were added 1,500 parts of a 10% aqueous solution of polyvinyl alcohol (Gosenol GH20 produced by Nippon Gosei Kagaku Co., Ltd.) and 5 parts of a 10% aqueous solution of ferric chloride. Upon polymerization at 80° C. for 10 hours, polymer particles having a uniform particle diameter and spherical in shape (number average particle diameter: 9.2 μm; standard deviation in the particle diameter distribution: 3%) were obtained.

EXAMPLE 18

10 parts of magnetite (EPT produced by Toda Kogyo Co., Ltd.) was dispersed in 60 parts of a 0.005 mol/l aqueous solution of ferric chloride (particle diameter: 1 to 5 μm), thereby providing the surface of the magnetite particles with positive charges.

40 parts of a 10% aqueous solution of sodium oleate was added to the above dispersion to thereby make the oleic acid absorbed on the particles. The dispersion was adjusted to pH 6-7 using diluted hydrochloric acid to remove an excess of oleic acid. In this way, magnetite was made oleophilic. These magnetite particles were used as seed particles. They were dispersed in 200 parts of a 5% aqueous solution of polyvinyl alcohol (Gosenol GH20) to prepare a dispersion of seed particles having a particle diameter of 0.3 to 0.5 μm.

| Styrene | 120 parts |
|---|---|
| Water | 200 parts |
| Sodium laurylsulfate | 1.5 parts |

These ingredients were emulsified with a Mantongaurin homogenizer to an extent that the diameter of styrene droplets was less than 0.1 μm. This styrene dispersion was added to the above seed particle dispersion, and the resulting mixture was slowly stirred over 18 hours to make the styrene absorbed on the surface of the magnetite.

| Azobisisobutyronitrile | 1 part |
|---|---|
| Toluene | 10 parts |
| Water | 50 parts |
| Sodium laurylsulfate | 0.3 part |

These ingredients were emulsified in such a manner that the particle diameter of droplets was less than 0.1 μm. This dispersion was added to the above dispersion to make the azobisisobutyronitrile absorbed on the surface of the magnetite.

Upon polymerization at 70° C. for 10 hours, magnetite containing polymer particles having a particle diameter range of 2 to 7 μm and a magnetic substance content of 8% were obtained.

EXAMPLE 19

| Tert-butylperoxy 2-ethylhexanoate (water solubility at 30° C.: 0.15 g/100 g H2O, Perbutyl O produced by Nippon Yushi Co., Ltd.) | 2 parts |
|---|---|
| Sodium laurylsulfate | 0.15 part |
| Water | 20 parts |

These ingredients were emulsified with supersonic waves to prepare a dispersion in which a particle diameter of Perbutyl O droplets was less than 0.5 μm.

To this Perbutyl O dispersion was added 50 parts of a monodisperse polystyrene latex (number average particle diameter: 0.80 μm; solids content: 2%), and the resulting mixture was slowly stirred at 30° C. for 8 hours to make the Perbutyl O absorbed on the polystyrene particles as seed particles.

| Styrene | 50 parts |
|---|---|
| Sodium laurylsulfate | 0.3 part |
| Water | 100 parts |

These ingredients were emulsified with supersonic waves to prepare a dispersion in which the maximum particle diameter of styrene droplets was less than 0.5 μm, and Dm was 3.2 μm. This styrene dispersion was added to the above seed particle dispersion, and the resulting mixture was slowly stirred at 30° C. for 12 hours to make the styrene absorbed on the seed particles.

Then 50 parts of acrylonitrile was added to the above dispersion without finely dispersing it, and the resulting mixture was stirred for one hour.

Thereafter 200 parts of a 5% aqueous solution of polyvinyl alcohol (Gosenol GH produced by Nippon Gosei Kagaku Co., Ltd.) was added. The temperature was raised to 80° C. to start polymerization. The polymerization was almost completed in 6 hours. The formation of aggregate was not almost observed, and the formation of new particles in an aqueous layer was not observed at all.

The polymer particles thus prepared were examined with a scanning-type electron microscope. It was confirmed that the polymer particles were nearly spherical in shape and had a greatly uniform particle diameter (number average particle diameter: 3.5 μm; standard deviation in the particle diameter distribution: 4%).

EXAMPLES 20 AND 21

Polymer particles were prepared in the same manner as in Example 19 except that 0.1 part of sodium laurylsulfate was used in place of the polyvinyl alcohol in Example 20 and 0.2 part of sodium larylsulfate was used in place of the polyvinyl alcohol in Example 21. In these cases, since dispersion stability during the polymerization process was poor, the system was stirred slowly and intermittently.

In Example 20, polymer particles having a uniform particle diameter (number average particle diameter: 3.2 μm; standard deviation: 10%) were obtained. The amount of aggregate formed was 4.5%.

In Example 21, polymer particles having a uniform particle diameter (number average particle diameter: 3.1 μm; standard deviation: 8%) were obtained. The amount of aggregate formed was 2.8%.

EXAMPLES 22 TO 29

Polymer particles were prepared in the same manner as in Example 19 except that different polyvinyl alcohols having the properties as shown in Table 5 were used.

The number average particle diameter and standard deviation of polymer particles obtained, and the amount of aggregate formed in each example are shown in Table 5. The results of Example 19 are also shown in Table 5.

TABLE 5

| Run No. | Properties of PVA | | Amount of Solids (%) | Polymer Particles | |
|---|---|---|---|---|---|
| | Degree of Saponification (%) | Degree of Polymerization | | Number Average Diameter (μm) | Standard Deviation (%) |
| Example 22 | 77 | 500 | 4.5 | 3.5 | 10 |
| Example 23 | 77 | 1,100 | 2.2 | 3.4 | 9 |
| Example 24 | 77 | 2,300 | 2.2 | 3.6 | 9 |
| Example 25 | 87 | 500 | 1.4 | 3.5 | 8 |
| Example 26 | 87 | 1,500 | 0.5 | 3.2 | 5 |
| Example 19 | 87 | 2,000 | 0.2 | 3.5 | 4 |
| Example 27 | 99 | 500 | 7.2 | 3.7 | 20 |
| Example 28 | 99 | 1,400 | 5.5 | 3.3 | 15 |
| Example 29 | 99 | 2,000 | 4.2 | 3.1 | 12 |

EXAMPLE 30

| | |
|---|---|
| Azobisisobutyronitrile | 2 parts |
| Styrene | 90 parts |
| Divinylbenzene | 10 parts |
| Sodium laurylsulfate | 1.5 parts |
| Water | 200 parts |

These ingredients were emulsified with a Manton-gaurin homogenizer (Model 15M) to prepare a dispersion in which a particle diameter of monomer droplets was less than 0.4 μm. This operation was performed while cooling so that the temperature of the system did not exceed 25° C.

The dispersion thus prepared was added to 50 parts of a monodisperse polystyrene latex (number average particle diameter: 0.7 μm; solids content: 2%), and the resulting mixture was slowly stirred at 25° C. for 48 hours to make the monomer absorbed on the polystyrene particles.

20 parts of 4-vinylpyridine was added, and moreover 100 pats of a 10% aqueous solution of polyvinyl alcohol (Gosenol GH20) was added. The temperature of the resulting mixture was raised to 70° C. to start polymerization. The polymerization was nearly completed in 5 hours.

The polymer particles thus prepared were examined with an optical microscope. It was confirmed that the polymer particles were nearly spherical particles having a number average particle diameter of 3.1 μm and a standard deviation of 5%.

The polymer particles were hydrophilic on the surface thereof and thus had good dispersibility in water.

EXAMPLE 31

2 parts of tert-butylperoxy 2-ethylhexanoate (Perbutyl 0 produced by Nippon Yushi Co., Ltd.) as a polymerization initiator, 85 parts of 2-ethylhexyl acrylate as the monomer of the general formula (I), and a mixture of 7 parts of styrene and 8 parts of divinylbenzene as the other monomer component were uniformly mixed and then finely dispersed in 200 parts of water with 1 part of sodium laurylsulfate dissolved therein with supersonic waves to an extent that the particle diameter of monomer droplets was less than 0.8 μm.

The above-prepared aqueous monomer dispersion was added to a monodisperse polystyrene latex (number average particle diameter: 0.90 μm; solids content: 5%), and the resulting mixture was slowly stirred at 30° C. for 12 hours to make the monomer droplets absorbed on the polystyrene particles as seed particles.

The above-prepared swollen seed particles had a uniform particle diameter of about 2 μm.

100 parts of a 10% aqueous solution of polyvinyl alcohol (Gosenol GH20 produced by Nippon Gosei Co., Ltd.) was added to the above dispersion. The temperature was raised to 80° C. to start polymerization. The polymerization was nearly completed in 4 hours. The formation of aggregate was not almost formed, and the formation of new particles in an aqueous layer was not observed at all. The polymer particles thus prepared were examined with a scanning-type electron microcope. It was confirmed that the polymer particles were nearly spherical particles having a greatly uniform particle diameter (number average particle diameter: 2.1 μm; standard deviation: 5%).

This aqueous dispersion of the polymer particles was diluted with water to an extent that the solids content was 1%. 500 ml of the aqueous dispersion was placed in a 500-milliliter graduated cylinder and was subjected to a standing stability test. After 30 days, formation of a sedimentation layer was examined. It was found that sedimentation did not occur at all.

EXAMPLE 32

| | |
|---|---|
| 3,5,5-Trimethylhexanoyl peroxide (Perloyl 355 produced by Nippon Yushi Co., Ltd.) | 2 parts |
| Sodium laurylsulfate | 0.18 part |
| Water | 25 parts |

These ingredients were emulsified with supersonic waves to prepare a dispersion in which a particle diameter of droplets was less than 0.7 μm. This dispersion was added to a mixture of 10 parts of a monodisperse polystyrene latex (number average particle diameter: 0.71 μm; solids content: 10.0%) and 7 parts of acetone. The resulting mixture was slowly stirred at 25° C. for 6 hours to make the droplets on the polystyrene particles as seed particles.

A mixture of 82 parts of 2-ethylhexyl methacrylate and 18 parts of styrene was finely dispersed in 300 parts of water with 2 parts of sodium laurylsulfate with supersonic waves to an extent of a particle diameter of droplets was less than 0.7 μm. This aqueous monomer dispersion was added to the above aqueous seed particle dispersion, and the resulting mixture was slowly stirred at 40° C. for 6 hous to make the monomer absorbed on the seed particles, thereby producing swollen particles.

100 parts of a 10% aqueous solution of polyvinyl alcohol (Gosenol GH20) was added to the above dispersion. In addition, 10 parts of a 5% aqueous solution of potassium dichromate as a polymerization inhibitor was added. The temperature was raised to 70° C., at which polymerization was carried out for 10 hours. The final conversion was 96%. The formation of aggregate and new particles was not almost observed.

The polymer particles thus prepared were examined with an optical microscope. It was found that the polymer particles were monodisperse, spherical particles having a uniform particle diameter (number average particle diameter: 3.3 μm; standard deviation: 3.6%).

The aqueous dispersion containing the polymer particles was diluted with water so that the solids content was 1%. This aqueous dispersion was placed in a 500-milliliter graduated cylinder and was subjected to a 30-day standing stability test. Sedimentation did not occur at all.

EXAMPLE 33

The procedure of Example 32 was repeated wherein 5 parts of the polymer latex prepared in Example 32 (particle diameter: 3.3 μm; solids concentration: 20.0%) was used in place of 10 parts of the monodisperse polystyrene latex (particle diameter: 0.71 μm; solids content: 10.0%), and as the monomer, lauryl methacrylate was used in place of 2-ethylhexyl methacrylate. A monodisperse polymer particle dispersion (number average particle diameter: 15.1 μm) was obtained.

This dispersion was diluted with water so that the solids content was 1%. 500 ml of the dispersion was placed in a 500-milliliter graduated cylinder and was subjected to a standing stability test. After 30 days, the dispersion was examined. Sedimentation did not occurr at all, and an upper aqueous layer was uniformly turbid.

EXAMPLE 34

| | |
|---|---|
| 3,5,5-Trimethylhexanoyl peroxide (Perloyl 355 produced by Nippon Yushi Co., Ltd.; water solubility at 20° C.: 0.01 g/100 g H$_2$O) | 20 parts |
| Sodium laurylsulfate | 0.15 part |
| Water | 20 parts |

These ingredients were emulsified with a supersonic homogenizer in such a manner that the maximum particle diameter of droplets was less than 0.5 μm.

The above dispersion was added to a mixture of 5 parts of a monodisperse polystyrene latex (particle diameter: 0.7 μm; solids content: 10%) and 6 parts of acetone, and the resulting mixture was slowly stirred at 25° C. for 12 hours to make the droplets on the polystyrene particles as seed particles.

| | |
|---|---|
| 2,2,3,3,4,4,5,5,-Octafluoroamyl acrylate (Biscoat 8F produced by Osaka Yuki Kagaku Kogyo Co., Ltd.) | 80 parts |
| Divinylbenzene | 10 parts |
| Styrene | 10 parts |
| Sodium laurylsulfate | 2 parts |
| Water | 300 parts |

These ingredients were emulsified with a high-pressure piston-type homogenizer (Type 15M manufactured by Mantongaurin Co.) to prepare a dispersion in which the maximum particle diameter of droplets was less than 0.5 μm.

This dispersion was added to the above seed particle dispersion. The resulting mixture was slowly stirred at 25° C. for 1 hour to make the monomer absorbed on the seed particles.

200 parts of a 5% aqueous solution of polyvinyl alcohol was added. Polymerization was carried out at 70° C. for 6 hours. Fluorine-containing polymer particles having a uniform particle diameter (number average particle diameter: 4.1 μm; standard deviation: 3%) were obtained in a yield of 98%.

Figure 5:
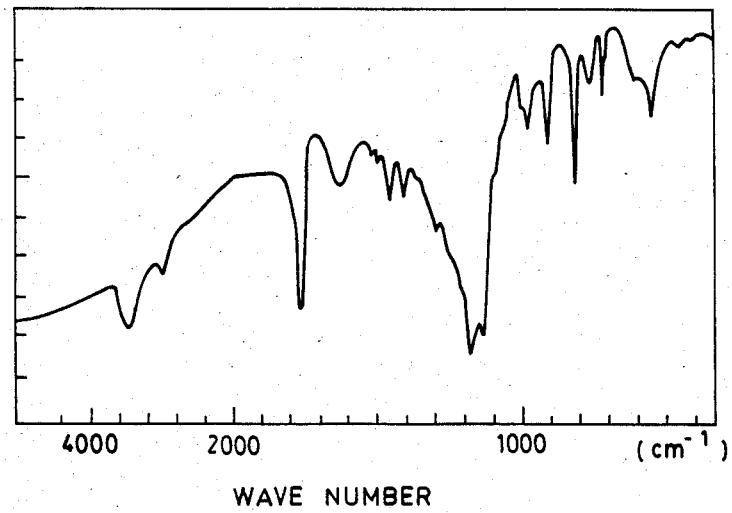
FIG. 5 is an infrared absorption spectrum of the above fluorine-containing polymer particle.
Figure 4:
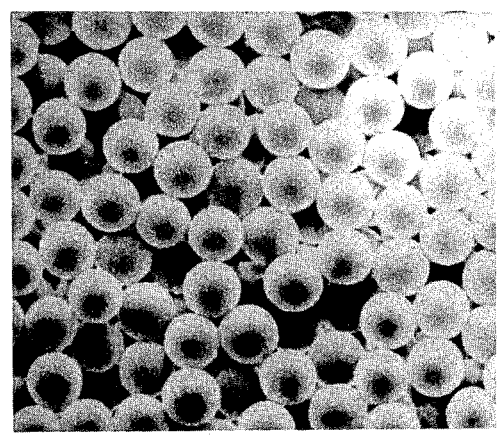
FIG. 4 is a scanning-type electron micrograph of fluorine-containing polymer particles as obtained in Example 34.

A scanning-type electron micrograph (×2000) of the polymer particles is shown in FIG. 4, and an infrared absorption spectrum (by the KBr tablet method) of the polymer particles is shown in FIG. 5. The fluorine content (as determined by the elemental analysis method) of the polymer was 42.3 wt%.

In order to examine non-aggregation properties of the polymer particles, the following test was carried out.

The polymer particles were washed with water, dried and powdered. About 10 mg of the powder was placed on one end of a glass plate (20 cm×20 cm). On blowing the powder using a blower provided with a brush for cleaning camera lenses, the powder was scattered in a mist form and uniformly extended over the top and back sides of the glass plate.

Examination of the powder on the glass plate with an optical microscope showed that the polymer particles were uniformly scattered and existed nearly one by one.

EXAMPLE 35

The procedure of Example 34 was repeated wherein 5 parts of a monodisperse polystyrene latex (number average particle diameter: 0.20 μm; solids content: 10%) was used as the seed polymer latex. Fluorine-containing polymer particles having a uniform particle diameter (number average particle diameter: 1.2 μm; standard deviation: 4%) were obtained in a yield of 98%.

The fluorine content of the polymer particles as determined by the elemental analysis method was 42.2 wt%.

EXAMPLE 36

The procedure of Example 34 was repeated wherein as the monomers, 30 parts of 2,2,2-trifluoroethyl methacrylate (Viscoat 3FM produced by Osaka Yuki Kagaku Kogyo Co., Ltd.), 5 parts of divinylbenzene, 5 parts of styrene, and 60 parts of methyl meethacrylate were used. Polymer particles were prepared in a yield of 96%.

These polymer particles were fluorine-containing polymer particles having a uniform particle diameter (number average particle diameter: 4.0 μm; standard deviation: 3.5%). The fluorine content (as determined by the elemental analysis method) of the polymer was 10.2%.

EXAMPLE 37

The procedure of Example 34 was repeated wherein as the monomers, 15 parts of 2,2,2-trifluoroethyl methacrylate (Viscoat 3FM produced by Osaka Yuki Kagaku Kogyo Co., Ltd.), 5 parts of divinylbenzene, 5 parts of styrene, and 75 parts of methyl methacrylate were used. Polymer particles were obtained in a yield of 95%. These polymer particles were fluorine-containing polymer particles having a uniform particle diameter (number average particle diameter: 4.0 μm; standard deviation: 3.1%). The fluorine content (as determined by the elemental analysis method) of the polymer was 4.9%.

What is claimed is:

1. A process for preparing large-sized polymer particles having a particular diameter in the range of 0.1 to 500 μm by seed polymerization, comprising:

(a) preparing a dispersion of finely dispersed polymerizable monomer by dispersing a monomer in an aqueous medium so that the number average particle diameter of the resulting monomer droplets is not larger than 0.8 μm and not larger than the number average particle diameter of seed particles in a dispersion of seed particles and so that the relationship of the number average particle diameter, Dm, of said monomer droplets in a semistable condition in the monomer dispersion and the desired number average particle diameter, D, of the final polymer particles produced upon polymerization of the monomer, satisifies the expression:

$$0.5 \times D < Dm < 3.5 \times D;$$

(b) combining said monomer dispersion with said dispersion of seed particles in order to absorb or adsorb the polymerizable monomer on the seed particles; and (c) polymerizing the polymerizable monomer in the presence of a polymerization initiator.

2. The process of claim 1, wherein the relationship of the number average particle diameter, Dm, of said monomer droplets in a semistable condition in the monomer dispersion and the desired number average particle diameter, D, of the final polymer particles produced upon polymerization of the monomer, satisifies the expression: $0.6 \times D < Dm < 1.8 \times D$.

3. The process of claim 1, wherein the monomer dispersion is prepared in such a manner that the maximum particle diameter of said monomer droplets is not larger than the number average particle diameter of seed polymer particles.

4. The process of claim 1, wherein the number average particle diameter, Dm, of said monomer droplets in semistable condition in the monomer dispersion is controlled by adding to the monomer an oily substance which has a water solubility of not more than 1/100 of that of the polymerizable monomer.

5. The process of claim 1, wherein the number average particle diameter, Dm, of said monomer droplets in a semistable condition in said monomer dispersion in controlled by adding an organic solvent completely miscible with water or an inorganic metal salt to said monomer dispersion.

6. The process of claim 1, wherein the polymerization initiator is finely dispersed in an aqueous medium and is combined with the dispersion of see particles in said seed particle dispersion independently from the polymerizable monomer.

7. The process of claim 1, wherein the polymerization initiator is an oil-soluble polymerization initiator.

8. The process of claim 1, wherein the polymerizable monomer is a monomer mixture containing 40 to 100 wt.% of a monomer of the formula (I):

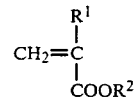

wherein $R^1$ is hydrogen or methyl and $R^2$ is an alkyl group of 6 to 18 carbon atoms.

9. The process of claim 1, wherein the polymerizable monomer is a monomer mixture containing at least 10 wt.% of a fluorine-containing polymerizable monomer having a fluorine content of not less than 25 wt.%.

10. The process of claim 1, wherein the desired number average particle diameter, D (μm) of the polymer particles of the product of polymerization is determined by the expression:

$$D = Ds \times \sqrt[3]{\frac{Mm}{Ms}},$$

wherein Ds is the average particle diameter (μm) of said seed particles, Mm is the amount (g) of the polymerizable monomer employed and Ms is the amount (calculated as solids) (g) of the seed particles.

11. The process of claim 1, wherein the polymerization is conducted in the presence of a dispersion stabilizer which is a member selected from the group consisting of anionic or nonionic surface active agents, organic or inorganic suspension protective agents, and mixtures thereof with the provision that when a surface active agent is employed in the dispersion stabilizer, the concentration of the same is below the critical micelle concentration of the surface active agent.

12. The process of claim 1, wherein the polymer particles in the product of polymerization have a particle size ranging from 5 μm to 500 μm.

* * * * *